April 11, 1967   E. A. BLOMGREN ETAL   3,313,656
METHOD OF OPERATING A FUEL CELL UTILIZING ULTRASONIC MIXING
MEANS REMOVED FROM THE FUEL CELL
Filed May 23, 1963
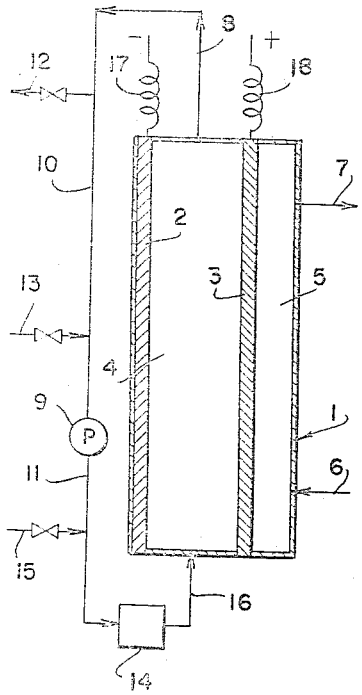
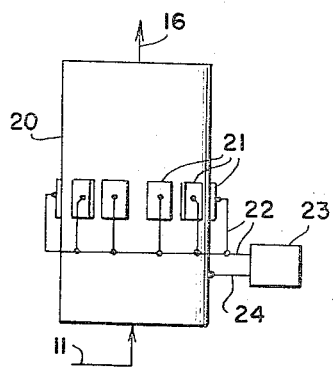
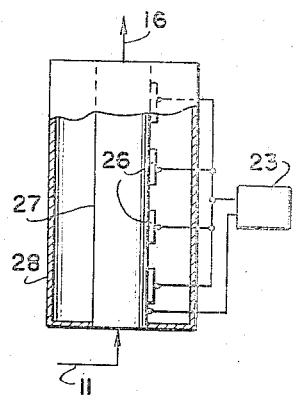
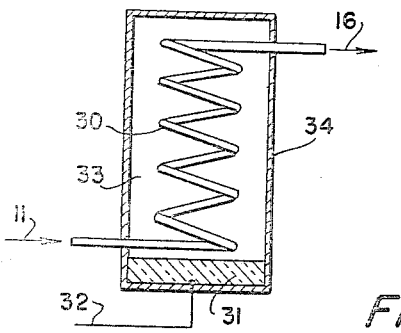
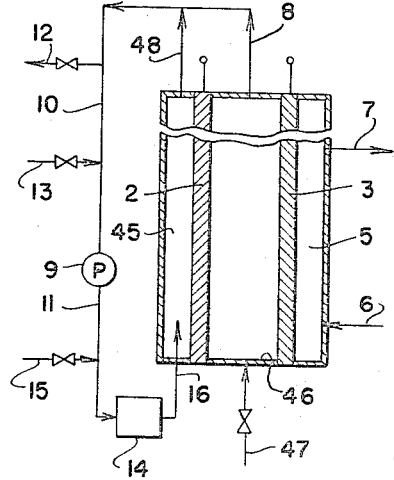
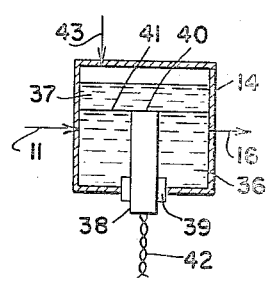
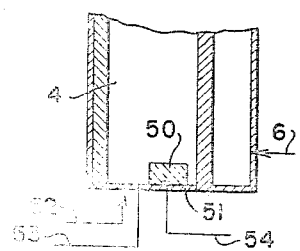
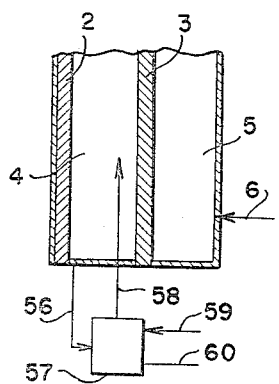
INVENTORS
ERIK A. BLOMGREN
STANISLAW J. SZPAK
BY
*A. H. Caser*
ATTORNEY United States Patent Office 3,313,656
Patented Apr. 11, 1967

3,313,656
METHOD OF OPERATING A FUEL CELL UTILIZING ULTRASONIC MIXING MEANS REMOVED FROM THE FUEL CELL
Erik A. Blomgren, South Pasadena, and Stanislaw J. Szpak, Mountain View, Calif., assignors, by mesne assignments, to Mobil Oil Corporation, a corporation of New York
Filed May 23, 1963, Ser. No. 282,669
13 Claims. (Cl. 136—86)

This invention relates to a method and means of operating a fuel cell, particularly one having a liquid electrolyte and employing a fuel which is fed to the fuel or working electrode in the presence of the electrolyte, i.e., the fuel is directly mixed with the electrolyte. More particularly, the fuel is one having a low equilibrium solubility in the electrolyte.

In a preferred form of the invention the fuel cell is operated at ambient temperatures and pressures and the fuel is a hydrocarbon. Such a cell comprises two spaced-apart electrodes, one for the fuel and one for the oxidant, between which a liquid electrolyte is present, contacting the adjacent surfaces of both electrodes. Suitably the electrolyte is an aqueous alkaline or acid solution of a kind conventionally used.

Fuel cells employing liquid electrolytes, wherein the fuel is supplied to the fuel electrode in admixture with the electrolyte, have drawn considerable interest but have a disadvantage in that only a few of the desirable fuels are soluble in the electrolyte. It will be appreciated in this connection that the more fuel that is brought in contact with the fuel electrode per unit time, the greater is the power output of the cell. If the fuel is insoluble or substantially insoluble in the electrolyte, it follows that less of it can be effectively brought to the fuel electrode, and as a result, the cell output is reduced. The use of solubilizing agents has been proposed to improve the solubility of the fuel, but they introduce a new problem in the operation of the cell, namely, side effects resulting from interferences of the agent with the electrode reaction. It is of course possible to use only fuels that are soluble in the electrolyte but this means that many otherwise desirable fuels, such as hydrocarbons, particularly liquid hydrocarbons, may not be used.

It is now proposed to make available to fuel cells of the type described a variety of useful fuels which, although insoluble in the electrolyte, are capable by means of the invention of being delivered to a fuel electrode in a form and at a rate suitable for rapid electrochemical oxidation, thereby to obtain from the fuel electrode current densities greater than would otherwise be possible. In brief, it is proposed to form the fuel and the electrolyte, singly or together, preferably the latter, into fine particles and to intermix the particles of one component with those of the other. Then, while the fuel is in a fine state of subdivision and finely dispersed throughout the electrolyte, the mixture is fed to the fuel electrode to be electrochemically reacted with the oxidant.

The invention may be better understood by referring to the accompanying drawing in which all the views are diagrammatic and in which FIG. 1 is a view of a fuel cell and a flow system for carrying out the invention;

FIGS. 2–5 are views of mixing or dispersing means;

FIG. 6 is a broken view of an alternative method of introducing fuel to a fuel electrode; and FIGS. 7 and 8 are partial views of modified flow systems.

In FIG. 1 there is shown a fuel cell 1 comprising a fuel electrode 2, an oxygen electrode 3, and an intervening electrolyte space 4. An oxygen supply space 5 is provided to one side of electrode 3, to which oxygen or air is supplied and removed by connections 6 and 7. An electrolyte-fuel mixture, comprising an aqueous ion-conductive solution of a base like potassium hydroxide or an acid like sulfuric, and a fuel such as a liquid hydrocarbon, is circulated through the compartment 4 and also through an external dispersion-forming means by the pump 9 which draws the mixture from compartment 4 through lines 8 and 10 and sends the same by line 11 to the dispersion-forming means or zone 14. It will be noted that the mixture may be withdrawn from line 10 by line 12, and that fuel may be added by lines 13 or 15. Suitable provision may also be made for removing from the circulating mixture carbon dioxide or other products of the fuel cell reaction.

In zone 14, described in more detail below, the mixture is converted to a highly dispersed state with both components in the form of fine droplets that are extremely well mixed. The dispersion leaves the zone by line 16 and enters compartment 4 where it comes into intimate contact with the surface of the electrode 2. Electric current produced by the cell may be removed, used, and returned by means of leads 17 and 18.

The dispersion-forming means in zone 14 may comprise a mechanical or ultrasonic or other device. Suitable mechanical devices include atomizers and devices employing a jet-edge system wherein a jet of liquid is projected against the edge of a blade. Ultrasonic devices may comprise those based on the magnetostriction effect and crystal transducers; the former rely on the oscillations of a bar or rod in a changing magnetic field, and the latter on piezoelectric crystals. The crystal transducers are preferred and may be described briefly.

Crystal transducers per se are conventional, comprising essentially a piezoelectric crystal such as quartz, Rochelle salt, barium titanate, or other natural or synthetic material which exhibits the piezoelectric effect, according to which the dimensions of the crystal change when an alternating voltage is applied to the crystal faces. As the voltage changes, so does the change in the dimensions, and when high frequency currents are applied, the mechanical changes in crystal dimensions are very rapid. For present purposes, currents having a frequency in the range of 30 kc. to 15 mc. per second, and more preferably 50–1500 kc. per second, may be applied to the crystal. Some illustrative devices using crystal transducers are shown in FIGS. 2–4. In FIG. 2, the device comprises tube 20 having a plurality of suitably supported transducers 21 disposed about its circumference and positioned substantially in the same plane. Leads 22 are shown connecting the transducers to a source of high frequency current comprising a conventional oscillator 23 which supplies current simultaneously to all the transducers. Lead 24 is connected to the ground. The electrolyte-fuel mixture enters the tube by line 11 and leaves by line 16 to enter the fuel cell. The transducers tend to concentrate their supersonic waves at a point, and the effect on the mixture is to form the components thereof into extremely fine particles or droplets; at sufficiently high frequencies the mixture may leave tube 20 in the form of a fine mist. A similar arrangement is shown in FIG. 3 except that the transducers 26 are disposed along the length of tube 27, and the latter may be enclosed in a housing 28. The mixture enters the tube by line 11 and exits through line 16. In FIG. 4 the mixture may traverse the device while enclosed in a coil 30 of stainless steel, glass, polyethylene, or other suitable material. The transducer 31 receives high frequency current through lead 32 connected to an oscillator not shown and produces ultrasonic vibrations in a suitable liquid 33, such as oil, which fills the chamber 34. The mixture in the coil may in this way be changed into the form of a fine dispersion.

Another suitable mixing arrangement is illustrated in FIG. 5 where the mixing zone 14 is shown to comprise a lower aqueous layer 36 of electrolyte and an upper layer 37 of fuel such as a liquid hydrocarbon. A crystal transducer 38 suitably supported in a holder 39 extends into the electrolyte so that an end surface 40 of the transducer is disposed just at the interface 41 between the electrolyte and fuel layers. Lead 42 supplies current to the transducer. It will be seen that at least a portion of the ultrasonic waves emanate from the interface 41, or, after operation has begun, from a plane in which the interface would lie if the components were at rest. This arrangement produces heavy clouds of dispersion, comprising electrolyte and fuel, which may then be removed through line 16 and passed to the fuel cell. Initially, electrolyte is introduced by line 11. After the mixture is in operation, recirculated dispersion may be admitted through line 11 while additional fuel is introduced through line 43. In an alternative arrangement the transducer may extend downwardly through the fuel, rather than upwardly through the electrolyte, so that an end surface such as 40 is disposed in the plane of the interface between the fuel and electrolyte, the arrangement otherwise being as shown in FIG. 5.

It may be seen that in FIGS. 2, 3 and 4, the ultrasonic waves emanate from a source at a side or wall of the mixing zone. In FIG. 2 the waves emanate from a plurality of sides of the zone. In FIG. 5, the waves emanate from a source in the interior of the electrolyte-fuel mixture.

If desired, a flow system as shown in FIG. 6 may be used wherein the electrolyte-fuel mixture is passed to a compartment 45 on the side of the fuel electrode 2 remote from the oxygen electrode 3. In this case the fuel diffuses into the porous electrode from the left, as seen in FIG. 6, while oxidant passes from compartment 5 into porous electrode 3 where it is consumed (absorbing electrons). The fuel undergoes oxidation on the walls of the pores in the fuel electrode. The electrolyte-fuel dispersion thus may leave compartment 45, pass through electrode 2 into compartment 46, and leave the latter through line 8 (as in FIG. 1), passing through line 10, pump 9, and line 11 to zone 14 and then back to compartment 45 through line 16. Part or all of the mixture may be removed through line 12, and replaced partly or entirely by additions introduced by lines 13 and/or 15. Additional fuel and/or electrolyte may be introduced by lines 13 and/or 15, as will be understood. Compartment 46 desirably should provide a short path for the flow of ions. In order to maintain such compartment filled with electrolyte at all times, inlet 47 may be provided through which electrolyte may be introduced as required or necessary.

All or any part of the dispersion may be diffused through the fuel electrode 2, as described in the preceding paragraph. If only a portion is so diffused, the balance of the dispersion, after operatively contacting the fuel electrode, leaves compartment 45 by line 48 and passes through the external flow system as just described. If desired, all of the mixture may be withdrawn through line 48 and recirculated, and in this case electrolyte is maintained in compartment 46. Such electrolyte may be the same as that already described, or it may be a conventional ion-permeable resin in the form of a membrane which will permit hydroxyl or hydrogen ions to pass. It may be noted that the electrolyte-fuel mixture may be in the form of a fine mist, as well as a dispersion, and may be sprayed into compartment 45 against the side of electrode 2.

In some cases circulation of the dispersion as shown in FIG. 1 may not be necessary. Instead, a dispersing action may be exerted on the fuel-electrolyte mixture while it is in the compartment 4, note FIG. 7, as by placing a crystal transducer 50 directly on the wall 51 of the chamber 4. Fuel may be added by line 52, and electrolyte added or removed by line 53. Current is supplied to the transducer by lead 54. Or, as shown in FIG. 8, the mixture may be brought out a short distance by line 56 to mixing device 57 and then returned by line 58, fuel being supplied through line 59 and electrolyte through line 60, and the dispersion removed through the latter as required.

It will be understood that in general any of the dispersion-forming procedures described may be employed with any of the flow systems.

It will be understood that the electrodes suitable for use in the fuel cell are generally porous. In the fuel electrodes of FIGS. 1, 7 and 8, the pores may not necessarily extend through the electrode from one side to the other but may be disposed in the surface which is contacted by the electrolyte-fuel mixture. In these cases the pores provide a large effective area, and the mixture may be presented thereto through the use of one or more nozzles, the fuel droplets penetrating into the pores by diffusion and/or convection. The fuel electrode of FIG. 6 has pores that penetrate the electrode from one side to the other so that fuel may pass through. The oxygen electrodes are conventional. All of the electrodes may be of conventional shape, i.e., in strip, sheet, or cylindrical form, and also in the form of a porous disk, and they may carry or comprise various catalytic materials. For example, catalyst-impregnated carbon or nickel or stainless steel electrodes are suitable, as well as electrodes of platinum, palladium, silver and other conventional electrodes.

As indicated, the electrolyte is conventional and includes aqueous solutions of alkali metal carbonates and bicarbonates as well as hydroxide. Conventional acidic electrolytes include solutions of phosphoric, nitric, perchloric, chloracetic, and other strong acids. Also applicable are aqueous solutions of ionizable neutral salts. It will be understood that the electrolyte does not react with the fuel.

Suitable fuels include the normal liquid hydrocarbons such as pentane, isopentane, hexane, heptane, octane, the branched C-6, C-7, and C-8 alkanes, cyclohexane, methylcyclohexane, methylcyclopentane, benzene, etc. Normally gaseous hydrocarbons may also be finely dispersed, say as bubbles, in aqueous electrolytes and include methane, ethane, propane, butane, isobutane, ethylene, propylene, etc. Another suitable fuel is hydrogen.

It will also be understood that the invention is not limited to a particular electrode, or electrolyte, or fuel, except that the fuel is one having little or no solubility in the liquid electrolyte, and the electrode is more or less porous. In particular, the fuel insolubility in the electrolyte is such that, in the absence of the invention, or of special solubilizing agents, practical operation is not possible of a fuel cell employing such fuel and electrolyte in admixture. Numerically, the fuel solubility in the electrolyte should preferably not be greater than about 0.005 mole/liter. This preference applies to any suitable fuel, particularly hydrocarbons.

Operating conditions may be conventional, and as described may include ambient temperatures and pressures. Where the fuel is higher boiling, temperatures just below the boiling point may be used at atmospheric pressure, although higher pressures may be used and in turn higher temperatures. For example, temperatures may range to 150° C. and pressures up to about 10 atmospheres. The increased temperatures and pressures may also apply to the lower boiling fuels.

In FIG. 1 and the other modifications it is permissible for the fuel-electrolyte dispersion to come into contact with the oxygen electrode, as indicated, provided the fuel does not undergo a reaction or does not interfere with the processes at this electrode. The occurrence of such reaction or interference with electrode processes may be controlled at least to some extent by the choice of catalytic material for both electrodes. However, where such choice is not available, and the fuel does undergo a reaction to a smaller or larger extent at the oxygen electrode, it is possible to introduce between the electrodes a porous membrane having a pore size too small to allow passage therethrough of dispersed fuel droplets in the dispersion; alternatively, there may be positioned between the electrodes an ion-permeable resin membrane which will permit only hydroxyl ions or hydrogen ions to pass through it, and is impermeable to fuel droplets.

The mixing step in zone 14 permits a degree of dispersion of fuel in the electrolyte to be obtained which will allow the droplets of fuel to pass into the pores of the fuel electrode. Particularly with crystal transducers operated at high frequencies, fuel droplets may be obtained having a diameter as low as 0.1 or even 0.01 of that of the electrode pores, with the upper limit of the diameter of the droplet being no more, and preferably slightly less, than the pore diameter. Generally, the lower sizes of droplets favor an increased rate of diffusion of the droplets into the electrode pores, and thus tend to increase the current producing capacity of the fuel electrode, although at the same time interferences with the oxygen electrode may increase. For practical purposes, therefore, the droplet size should lie between the pore size and a size about 0.01 that of the pore size. By way of example, if the pore diameter of the electrode is between 0.5 and 50 microns, the droplet diameter of a fuel such as a liquid hydrocarbon may range from 0.05 to about 50 microns; while for gaseous hydrocarbons, which form bubbles in the dispersion, the bubble diameter may be in the same range.

The rate of circulation of the dispersion should of course be high enough to correspond to the rate of consumption of the fuel in the electrode reaction. This in turn depends on the amount of fuel contained in a unit volume of the dispersion, which for dispersions of the type under consideration preferably may range from 0.1 to 10 volume percent of fuel. Considering about 0.1 to 10 percent of the fuel to be consumed during its passage through the fuel electrode in an arrangement such as illustrated in FIG. 6, an adequate circulation rate of the dispersion in terms of speed of movement may range from 0.1 to about 50 cm./sec. in the case of liquid fuels. At these circulation rates current densities of 50 to 200 milliampere/sq. cm. may be obtained. Where the dispersion contains a normally gaseous hydrocarbon fuel, the circulation rate is preferably higher and may range from 0.1 cm./sec. to several meters per second.

Another factor upon which circulation rate may depend is the tendency of the dispersion to separate into phases, i.e., if left to stand too long, the dispersed fuel droplets of the dispersion tend to coagulate to form larger drops. Considering a dispersion of the kind described to have a coagulation time of several minutes, and considering the circulation path to range from about 10 centimeters to 1 meter, the required circulation speed may range from a few hundredths to several cm./sec. to avoid substantial coagulation during circulation. A third factor upon which circulation rate may depend is the speed or rate at which fuel is dispersed into the electrolyte in the zone 14. At steady state conditions, this rate of dispersion, as it may be called, must compensate for the fuel consumption in the electrode reaction and for any coagulation of the droplets in the circulation path. While fuel consumption and coagulation both require a high rate of circulation, the efficiency of the dispersing step generally is favored by a decrease of the circulation rate. This means that at higher circulation rates, the dispersion of the fuel is required to be more efficient.

On balance, the circulation rate is determined primarily by the fuel consumption and the dispersion efficiency rather than the coagulation rate, and in practice the preferred rate is a compromise between the two primary factors. It may be mentioned that above certain rates of circulation the output of the fuel cell tends to become less dependent on circulation rate.

By way of example, with electrodes having a pore diameter between 0.5 and 50 microns, and with liquid hydrocarbons, the circulation rate of the dispersion may range from 0.01 to 50 cm./sec., while for gaseous hydrocarbons the rate may range from 0.1 cm./sec. to 5 meters/sec.

While the foregoing description envisages electrolyte-fuel dispersions in which the electrolyte is the major component, the invention also contemplates dispersions in which the fuel component is increased so that it is more nearly equal to, or the same as, the electrolyte component and may also exceed the latter. The resulting dispersions may have the advantage of meeting increased demands for fuel per unit time. In all of the dispersions it is advantageous to select, where possible, an electrolyte which favors prolongation of the dispersion.

In a typical operation, iso-octane, a substantially water-insoluble fuel, is formed into a dispersion with an electrolyte consisting of aqueous 1 normal potassium hydroxide solution, using a dispersing means similar to that illustrated in FIG. 5, and the resulting mixture is circulated through a porous platinized platinum fuel electrode in a flow system according to FIG. 6. The oxygen electrode is also platinized platinum. Atmospheric pressure is employed while the temperature is about 80° C., which is substantially below the boiling point (99° C.) of iso-octane at 1 atmosphere. The limiting current density obtainable is at least 10 to 100 times greater than that from the same operation but in which the iso-octane is not dispersed in the electrolyte, being simply mixed therewith and allowed to reach equilibrium solubility therein. The same is true regarding the terminal voltage obtainable at the limiting current density.

It will be understood that the invention is capable of obvious variations without departing from its scope.

In the light of the foregoing descriptions, the following is claimed.

1. An improved method of operating a fuel cell having a pair of spaced-apart fuel and oxygen electrodes with an electrolyte compartment therebetween and employing fuel and electrolyte in admixture which comprises employing a fuel which is non-reactive with the electrolyte and has an equilibrium solubility therein of less than about 0.005 mole per liter, forming the fuel into a fine state of subdivision in a zone removed from said fuel cell by impinging ultrasonic waves on the mixture to physically agitate and disrupt the same, thereby to form a fine dispersion of fuel and electrolyte, flowing said dispersion to the fuel electrode, thereby making said fuel available in finely sized finely dispersed form thereto, coincidently therewith producing a flow of current through the cell which is greater than if the fuel were not finely dispersed in the electrolyte, then flowing the dispersion out of said fuel cell and replenishing the fuel content thereof, subjecting the replenished dispersion to the action of said ultrasonic waves in said zone, and recirculating the dispersion to said fuel electrode.

2. Method of claim 1 wherein the fuel and electrolyte mixture is impinged in said zone by ultrasonic waves emanating from the interior of the mixture.

3. Method of claim 2 wherein said waves emanate from a plane in which lies the interface between the fuel and electrolyte.

4. Method of claim 1 wherein said fuel and electrolyte are flowed through said zone and are impinged by ultrasonic waves emanating from a side of said zone.

5. Method of claim 4 wherein said flow is through a closed path in said zone, and said waves are impinged on the flow in said path through an intervening liquid.

6. Method of claim 4 wherein said waves emanate from a plurality of sides of said zone.

7. Method of claim 1 wherein said dispersion is introduced to the fuel cell through a fuel electrode compartment on a side of the fuel electrode remote from the electrolyte compartment, and at least a portion of the dispersion is passed through the fuel electrode into the electrolyte compartment.

8. Method of claim 1 wherein said dispersion is introduced to the fuel cell through a fuel electrode compartment on a side of the fuel electrode remote from the electrolyte compartment, and at least a portion of the dispersion is passed along the adjacent surface of the fuel electrode.

9. Method of claim 1 wherein said dispersion is introduced to the fuel cell through said electrolyte compartment and flowed along the adjacent surface of the fuel electrode.

10. In the operation of a fuel cell employing a hydrocarbon as the fuel and a liquid electrolyte, and in which a porous fuel electrode is disposed, and wherein said fuel is substantially insoluble in the electrolyte, the improved method of bringing said fuel into contact with the fuel electrode to favor the rapid electrochemical oxidation of the fuel which comprises mixing the fuel and electrolyte and impinging ultrasonic waves on the mixture to physically agitate and disrupt the same said mixing and ultrasonic impinging being in a zone external to the fuel cell, thereby to form extremely fine particles of fuel dispersed in extremely fine particles of electrolyte, introducing said dispersion to the fuel electrode, thereby to produce a flow of current through the cell which is greater than if the fuel were not finely dispersed in the electrolyte, then passing the dispersion out of the cell and recirculating the same to said zone, and thereafter returning the same to said fuel electrode.

11. Method of claim 10 in which said dispersion is passed through the porous fuel electrode before passing the same out of the cell.

12. Method of claim 10 in which said dispersion is passed along a surface of the fuel electrode before passing the same out of the cell.

13. A system comprising a fuel cell having a pair of spaced apart fuel and oxygen electrodes with an electrolyte compartment therebetween, a mixing zone removed from said fuel cell containing means impinging ultrasonic waves through said mixing zone, conduit means connecting said mixing zone and said fuel cell, fuel and electrolyte inlet means connected to said mixing zone and means to transfer said fuel and electrolyte from said mixing zone to said fuel cell.

References Cited by the Examiner
UNITED STATES PATENTS

| | | | |
|---|---|---|---|
| 2,925,454 | 2/1960 | Justi et al. | 136—86 |
| 3,152,016 | 10/1964 | Drushella | 136—86 |
| 3,242,010 | 3/1966 | Bodine | 136—86 |

WINSTON A. DOUGLAS, *Primary Examiner.*

B. J. OHLENDORF, *Assistant Examiner.*